March 31, 1936.  A. H. NELSON  2,035,912
FRUIT PITTING, STEMMING AND SLICING MACHINE
Filed July 8, 1931   6 Sheets-Sheet 1
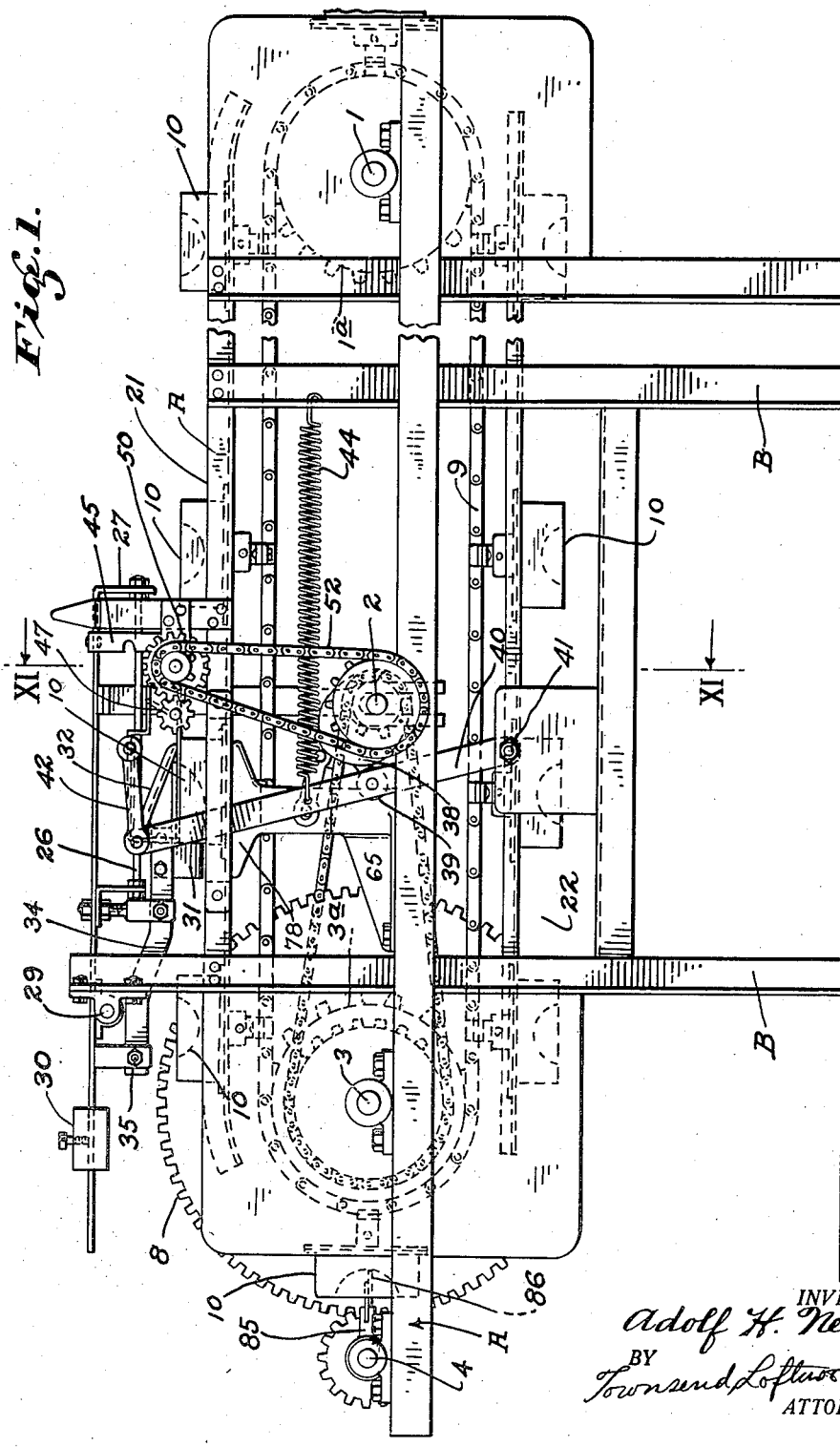
INVENTOR.
Adolf H. Nelson.
BY
Townsend Loftus Abbett
ATTORNEYS.

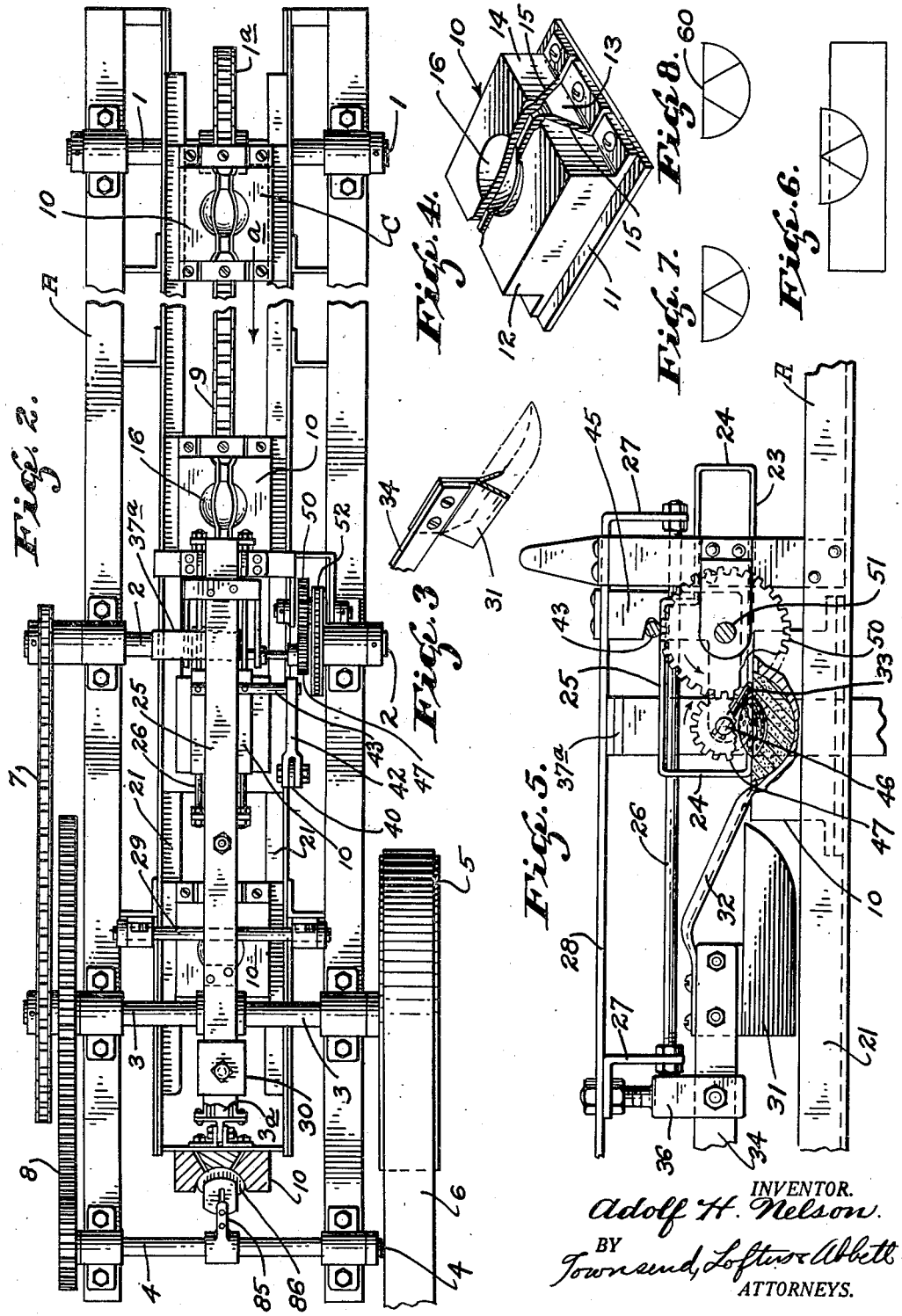

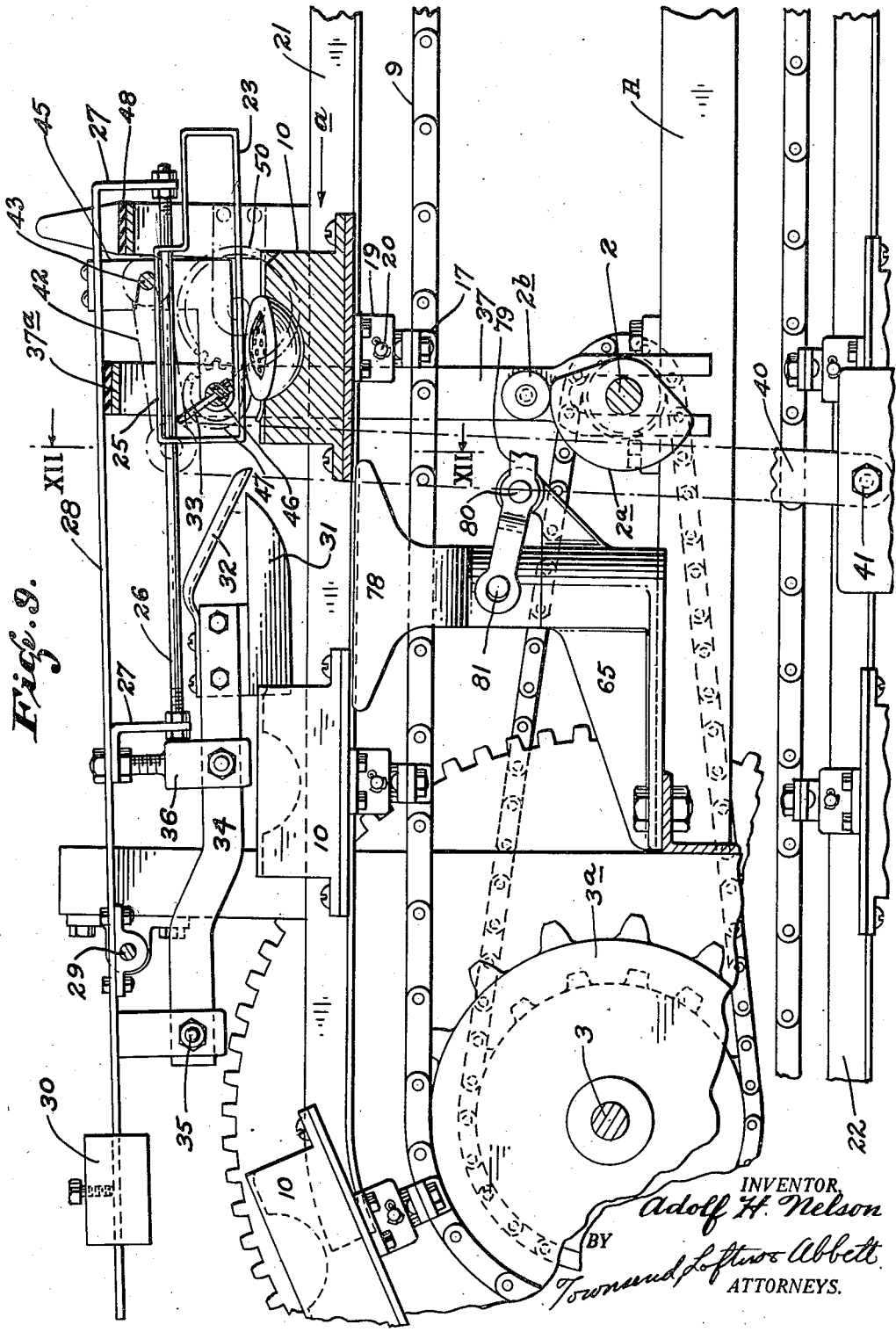

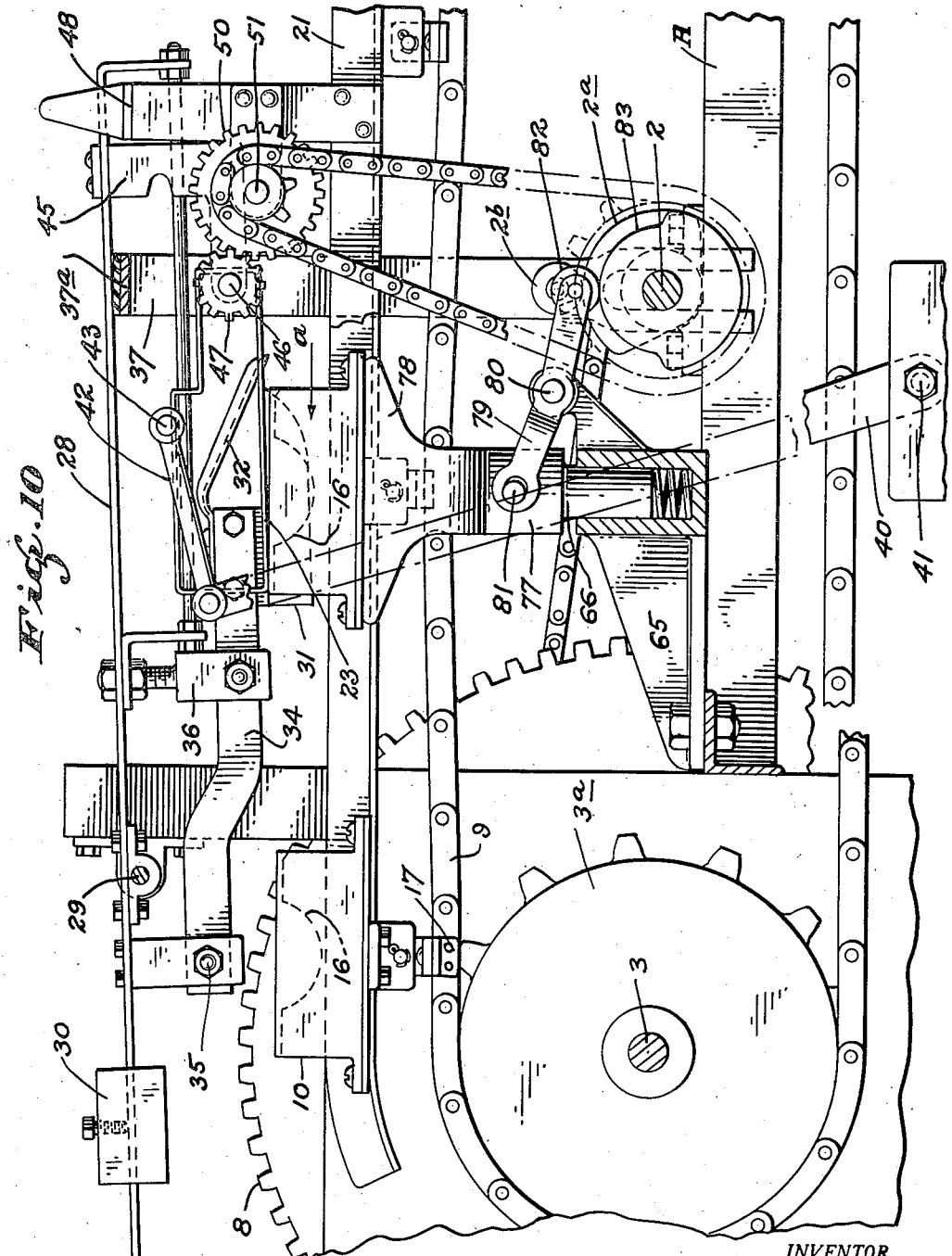

March 31, 1936. A. H. NELSON 2,035,912
FRUIT PITTING, STEMMING AND SLICING MACHINE
Filed July 8, 1931 6 Sheets-Sheet 5
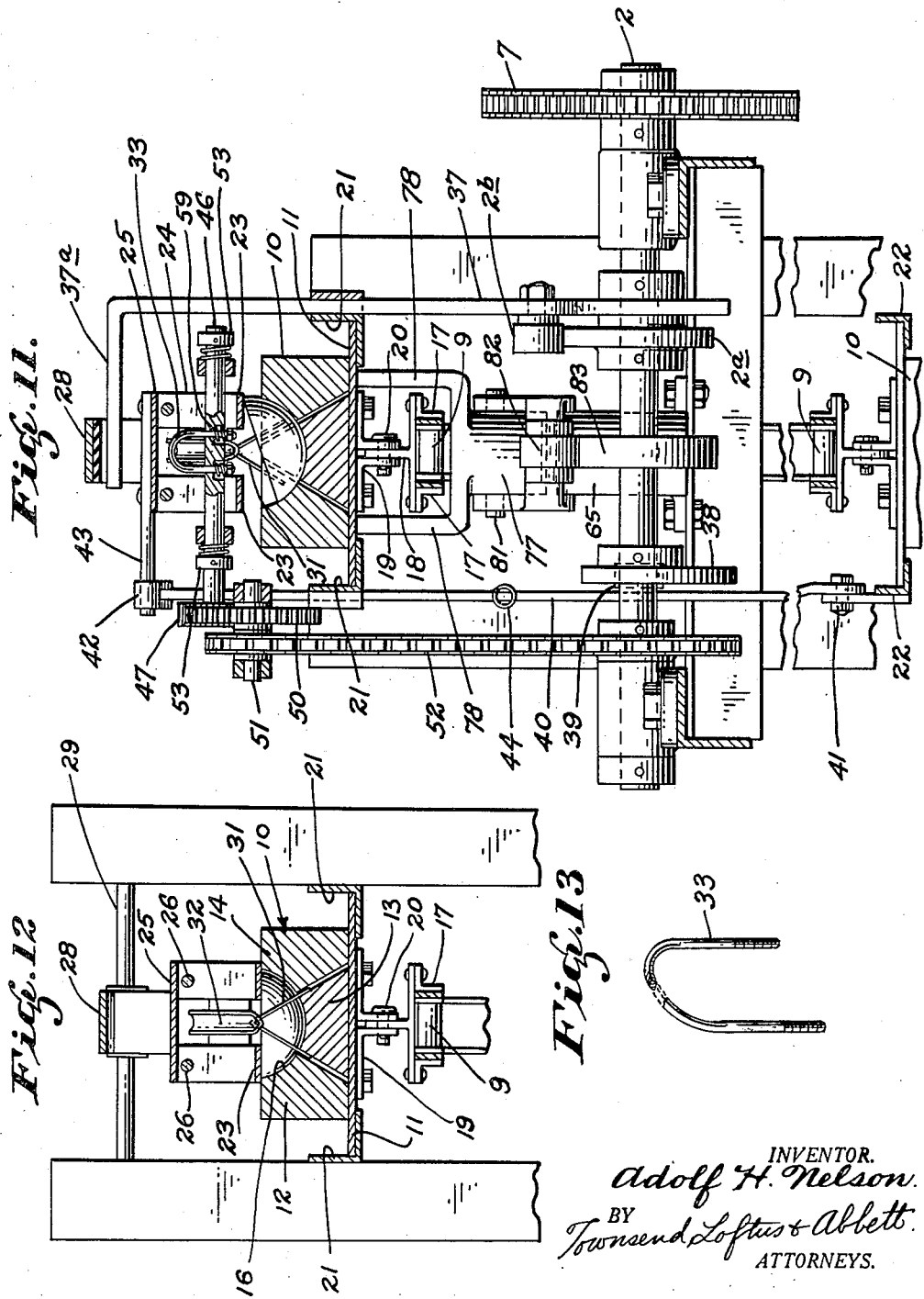
INVENTOR.
Adolf H. Nelson.
BY Townsend Loftus & Abbett.
ATTORNEYS.

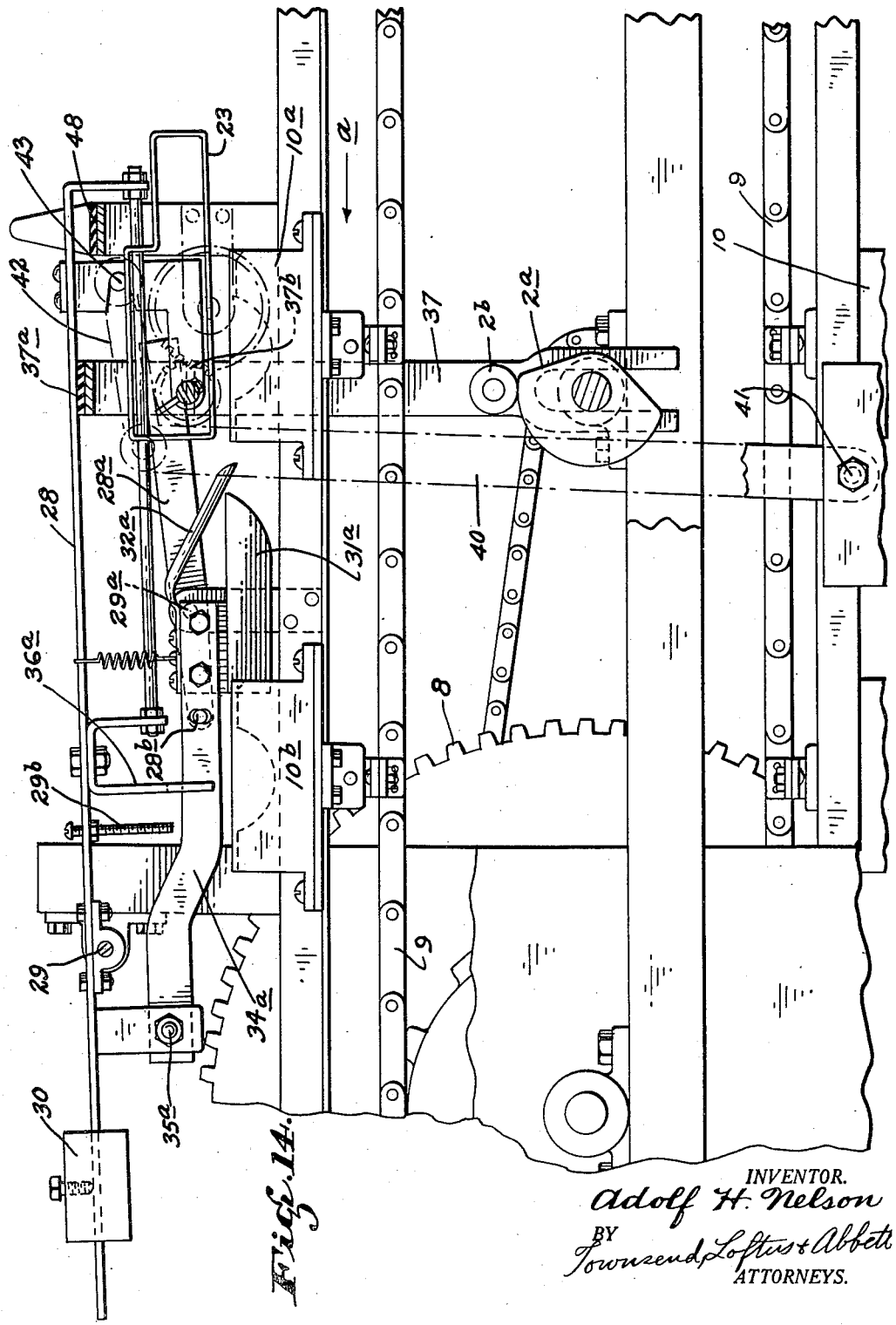

Patented Mar. 31, 1936

2,035,912

UNITED STATES PATENT OFFICE 2,035,912

FRUIT PITTING, STEMMING, AND SLICING MACHINE

Adolf H. Nelson, San Francisco, Calif., assignor to Pacific Machinery Company, San Francisco, Calif., a corporation of California Application July 8, 1931, Serial No. 549,427

22 Claims. (Cl. 146—28)

This invention relates to a machine for pitting or coring fruits of various kinds and for stemming and slicing the same.

The object of the present invention is to generally improve and simplify the construction and operation of machines of the character described; to provide a machine whereby fruits of various kinds containing either cores or pits may be cored or pitted and then stemmed and cut into as many slices as desired; to provide a machine of this character to which the fruit to be cored, pitted, etc., is delivered in a halved condition; to provide means for automatically positioning the halved fruit after delivery so as to insure a uniform product as to the position and depth of the core and as to the size of the slices; to provide a main and a secondary holding means to secure the fruit during the pitting, stemming and slicing operations; to provide a main holding means which is readily interchangeable to conform to fruits of different shapes and kinds; further, to provide a counterbalance secondary holding means whereby crushing or mutilation of the fruit is prevented.

The invention is shown by way of illustration in the accompanying drawings, in which—

Fig. 1 is a side elevation of the machine.

Fig. 2 is a plan view of the same.

Fig. 3 is a perspective view partially in section of one form of slicing knife employed.

Fig. 4 is a perspective view of one form of fruit holder employed.

Fig. 5 is a partially enlarged side elevation which partially illustrates the pitting or coring knife.

Fig. 6 is a diagrammatic view of the type of holder shown in Fig. 4 showing a halved fruit placed therein.

Figs. 7 and 8 are diagrammatic views showing the result of properly and improperly positioning the slicing knives with relation to the surface of the fruit.

Fig. 9 is an enlarged side elevation of the machine partially in section showing the raised position of the secondary holder.

Fig. 10 is a view similar to Fig. 9 showing the position of one of the main holders during the slicing operation.

Fig. 11 is a cross section taken on line XI—XI of Fig. 1.

Fig. 12 is a cross section taken on line XII—XII of Fig. 9.

Fig. 13 is a perspective view of the pitting knife.

Fig. 14 shows a modified mounting for the stemmer and slicing knife.

Referring to the drawings in detail and particularly Figs. 1 and 2, A indicates a main frame supported by legs B or similar devices. Disposed crosswise of the main frame are four shafts indicated at 1, 2, 3 and 4. The shaft 2 will hereinafter be referred to as a cam shaft and shaft 3 as the driving shaft, as this shaft carries a pulley 5 and a belt 6 driven by any suitable motor or like device. The cam shaft 2 is driven from the shaft 3 through a chain 7 and sprocket gears as shown and shaft 4 is driven by shaft 3 through spur gears 8. Shafts 1 and 3 are provided with sprocket gears 1a and 3a and these carry an endless sprocket chain 9 to which is attached a plurality of carrier blocks 10, which will hereinafter be referred to as the main holders. One of the main holders in shown in Fig. 4. It consists of a base plate 11 on which is secured three blocks indicated at 12, 13 and 14. The blocks are independently secured by means of screws and any one or all can be removed without disturbing the others. The blocks are separated with relation to each other as shown at 15 to form channels between the same and the adjacent faces formed in the slots are disposed on an angle for purposes hereinafter to be described.

The upper faces of the blocks are recessed to form a pocket 16 and this pocket is shaped according to the fruit to be handled. In the present instance the pocket is substantially semi-spherical and is intended for the reception of fruits such as peaches or the like. If the machine is to handle pears the pocket 16 will be shaped accordingly. The chain 8 supported by the sprockets 1a and 3a has attached thereto a suitable number of main holders such as shown in Fig. 4, the manner of attachment being best shown in Figs. 11 and 13. In these views 9 indicates the upper run of the chain. Secured to the sides thereof are lugs 17 and secured to said lugs is a T-shaped bracket 18. Secured to the base plate 11 of each holder are angle brackets 19 between which the T-shaped lug 18 extends and pivotally connecting the brackets or lugs 18 and 19 is a pin 20. This forms a pivotal connection between the chain 9 and the base 11 of a main holder and as the connection between the respective main holders and the chain is the same the description of one should suffice.

Track members 21 are disposed on opposite sides of the main frame and extend from end to end thereof. These tracks support the base plates 11 and the main holders secured thereto, hence forming a support with relation to the upper run of the chain from which the main holders travel during the pitting, stemming and slicing operations hereinafter to be described. Similar track members 22 are placed in the lower part of the frame to support the holders during the return operation but these are not material as it is not exactly necessary to support the holders during the return period.

For the purpose of simplifying the description, it will be assumed that the present machine is designed for pitting, stemming and slicing peaches. If that is the case, the peaches are halved either by hand or machinery before delivery to the machine. In the present instance it will be assumed that they are delivered by hand and are placed in the pockets 16 of the respective holders at the forward end of the machine indicated at C with the cut or flat surface facing upwardly. When a halved peach with a pit therein has been placed in the main holder the holder will move forward in the direction of arrow a, the movement being steady and at a continuous rate of speed depending upon the number of revolutions of the drive shaft 3. As the main holder with a half section of a peach deposited therein travels forward it will first reach a position where the fruit is properly positioned. For instance, by referring to Fig. 11, it will be noted that the upper face of the halved peach is lying at an angle with relation to the surface of the main holder. A combination secondary holder and positioning means is provided to straighten out the halved peach so as to assume the position shown in Fig. 12. The secondary holder comprises a pair of shoes 23 carried by end arms 24 and a head member 25. The head member is slidably mounted on a pair of rods 26 and the rods are in turn secured in downturned brackets 27 secured to a frame which is pivotally supported with relation to the main frame A as indicated at 29. The pivoted frame is counterbalanced as indicated at 30, see Fig. 1, so that too much weight will not be exerted between the shoes 23 and the surface of the fruit to be positioned. Too much weight applied might have a tendency to crush or mutilate the fruit and this is avoided by the counterbalance 30.

The pivoted frame besides supporting the positioning and holding shoes 23 also forms a support for a slicing knife 31, a stemmer or scoop 32, and a pitting blade 33. The slicing knife and scoop 32 are secured to a lever 34 pivotally secured to the frame 28 as at 35. The lever is adjustable with relation to the frame 28 through the adjusting link 36 and it is thus possible to properly adjust the slicing knife and the scoop 32 as will hereinafter appear.

The pivoted frame 28 is normally held in the raised position shown in Fig. 9, but when a main holder with a peach placed therein reaches the position shown in Fig. 9, the free end of the frame 28 is lowered about the pivot 29 so that the shoes can engage the flat surface of the peach first to position it properly and secondly to hold it during the pitting, stemming and slicing operations.

The means for raising and lowering the frame comprises a cam 2a secured on shaft 2, see Fig. 9. The cam engages a roller 2b and this is secured on a vertically disposed bar 37. The bar is guided at one side of the frame and its upper end is provided with a finger or arm 37a which engages the forward end of the pivoted frame 28. During rotation of the cam shaft, cam 2a moves out of engagement with the roller 2b, hence permitting bar 37 to be lowered and as the upper end of the bar indicated at 37a supports the frame in raised position the frame will be lowered and as it lowers the shoes will properly position the peach and at the same time assist to hold the same. During the lowering movement just described the main holder is traveling in the direction of arrow a at a continuous predetermined speed and if the shoes 23 were not moved in unison with the same the peach would soon ride out of engagement with the shoes and the shoes would lose their function, hence means are provided for moving the shoes rearwardly on the guide rods 26 so as to maintain the shoes in contact with the peach both during the positioning operation and during the pitting, stemming and slicing operations.

The mechanism for transmitting movement to the shoes, or what will hereinafter be termed the secondary holder, comprises a cam 38 also secured on the cam shaft 2. This cam engages a roller 39 secured on a lever 40. This lever is pivoted as at 41 in the lower part of the frame. Its upper end is connected through a link 42 with a cross bar 43 secured to the head member which carries the shoe. The cam 38 moves into engagement with the roller 39 at the time the shoes are lowered, hence permitting the shoes to move in unison with the main holder and at the same rate of speed as that of the holder during the pitting, the stemming and the slicing operations. After these operations are completed cam 38 rides free of the roller 39 and a spring 44 returns lever 40 and the shoes to the normal forward position, shown in Fig. 9, in readiness to cooperate with the next holder moving into position.

The pitting operation is accomplished as follows: Secured to the pivoted frame 28 is an L-shaped bracket 45 and journaled in said bracket is a shaft 46 on one end of which is secured a gear 47. Also carried by the shaft is a pitting knife 33. This knife is shaped to conform to the pit or core to be removed, its forward edge being sharp to produce a clean cut. The knife employed when pitting peaches is substantially U-shaped. The upper ends of the pitting knife extend through the shaft 46 and are resiliently supported therein by means of springs 59. This is an important feature which will be more clearly understood from the following description. Peaches, although closely graded, often have pits of varying length or size, hence if a peach with a fairly large pit is placed in the main holder it is possible that as the pitting knife sweeps down against the end of the pit it may strike the end and unless the pitting knife was resiliently held, that is, free to move endwise with relation to the shaft 46 it would either bend the blade or otherwise crush the fruit, but due to the free endwise movement permitted the blade will yield until the main holder advances sufficiently to permit the pitting blade to clear the end of the pit at which moment it will begin to swing in under the pit and free it from the peach. Shaft 46 is continuously driven through means of a gear 47 which intermeshes with a gear 50. This gear is secured on a shaft 51, see Fig. 11, journaled on one side of the main frame and the shaft is in turn driven from the cam shaft 2 through means of sprocket chain 52 and sprockets shown in Fig. 1. Shaft 46 is not only continuously rotated through means of the drive described but it has a slight endwise movement so that the pitting blade can center itself with relation to the pit. The L-shaped brackets are indicated at 45 in Fig. 11. Collars 53 are secured on the shaft on opposite sides of the brackets and springs are interposed between the collars and the brackets thereby yieldingly holding the shaft against endwise movement and permitting the pitting knife to center itself with relation to the pit. The speed of rotation on the shaft 46 is such that as the main holder with the peach deposited therein passes under shaft 46 it makes slightly more than one-half of a revolution thus completely freeing the pit with relation to the peach. After the pitting operation is accomplished the point of the scoop indicated at 32 engages the stem and removes it and at the same time engages the pit and pushes it out of the peach as it has already been cut free therefrom. After the stem and pit have been removed the point of the slicing knife 31 enters the channels 15 formed in the main holder and as the main holder advances the knives pass through the peach cutting it into three slices. It should, however, be understood that the halved peach may be cut in two, or in other words, quarters. It may be cut in three sections or as many as desired, depending upon the number of slots formed and the number of blades on the slicing knife.

During the pitting, the stemming and the slicing operations it is essential that the upper surface of the halved peach shall function as a guide, that is, it limits the downward movement of the shoes and as such limits the downward movement of the pivoted frame 28 which carries the pitting knife, the stemmer and the slicing knife. These are so disposed with relation to the surface of the peach that the peach is pitted to the proper depth and it is stemmed and sliced uniformly. For instance, by referring to Fig. 6, which is a diagrammatic section of a main holder, it will be noted that the flat surface of the peach projects above the surface of the holder. If the downward movement of the shoes were not limited by the flat surface of the peach, the peach would be crushed or mutilated but this can not happen with the counter-balancing mechanism already described. If the shoes stop when engaging the flat surface of the peach the downward movement of the pivoted frame 28 stops and if the pitting knife, the stemmer and the slicing knife are properly positioned the depth of the pitting operation is predetermined. The depth of the stemming operation is determined and the upper surface of the slicing knife will align with the upper surface of the peach thus producing three slices of uniform appearance and with sharp points at the center as shown in Fig. 7. If the movement of the pivoted frame and shoes was always the same and if a small peach was placed in the main holder the result of the slicing operation would be as shown in Fig. 8, the central section would have a flat surface at the point indicated at 60 and would be larger than the adjacent sections but as the shoes can settle down to the surface of the holder such non-uniformity is avoided.

An important feature to be considered in connection with the pitting operation is the direction of rotation. By referring to Fig. 5 it will be noted that 33 rotates in the direction of the arrow and as gear 47 is driven by gear 50 it will rotate towards the same in the direction of the arrow indicated. Shaft 46 carries the pitting knife, hence this will enter the peach at a point behind the pit as shown in Fig. 5 and will sweep in under and then forward of the same. This movement is important as the downward pressure exerted due to the direction of rotation of the gears and cutting blade positively prevents lifting of the frame 28 during the pitting operation. Conversely, the moment the pitting blade enters and starts under the pit it may be said that the frame 28 is locked against upward movement, as the knife sweeps under the pit the pressure is downward and if the frame would tend to lift it would have to lift the pit with it. The forces applied, however, are in a downward direction, hence there is no tendency of the frame to lift.

It was previously stated that the forward end of the frame 28 was maintained at an elevated position by means of the finger or arm 37a actuated by the cam 2a. The mechanism just described elevates the frame 28 and it also permits lowering movement thereof. The lowering movement under normal conditions is determined by the surface of the peach placed in a holder but if the peach happens to be so small that it does not project above the surface of the holder a stop member indicated at 48 is employed to limit the lowering movement. The stop member is a bar which extends across the frame and engages the outer end of the frame 28 and thus prevents actual contact of the shoes with the upper surface of the holder. Such contact would bring about metal to metal contact which in this instance is avoided as any desired clearance may be maintained by the cross bar 48.

It was previously stated that the pivoted frame 28 was raised through means of the cam 2a after the pitting, stemming and slicing operations had been completed. This statement is correct, but it may be mentioned that the lifting or raising operation commences before the main holder has passed entirely clear of the slicing knife 31. One or more blades formed on the slicing knife are angularly disposed and so are the channels 15, which are provided for their reception, hence if the raising movement commences before the main holder clears the slicing blades there would be a binding action between the holder and the blades. The channels may be sufficiently wide to avoid such binding action but where the clearance is not sufficient it is necessary to impart a raising movement to the main holder. This is accomplished by the mechanism shown in Figs. 10 and 11.

By referring to Fig. 10, it will be noted that a bracket 65 is secured to one of the standards of the frame. Supported by the bracket is a shaft 66 and slidably mounted thereon is a sleeve-shaped member 77, the upper end of which is forked to provide a pair of arms 78, see Fig. 11. The sleeve and the fork-shaped arms carried thereby are vertically slidable on the shaft 66, the shaft merely forming a guide therefor. Vertical movement is transmitted through means of a crank arm 79 pivotally supported as at 80 on the bracket 65. One end of the crank arm engages pins 81 projecting from the sleeve while the other end of the crank arm is provided with a roller 82 which engages a cam 83. This cam is secured on the cam shaft 2 and cooperates with the cam 2a whereby the pivoted frame 28 is raised and lowered. When cam 2a commences to raise the bar 37 and the pivoted frame 28, cam 83 will at the same time engage the roller 82 and thereby impart a rocking movement to the rocker arm 79, this movement is transmitted to raise the sleeve and the upper ends of the arms 78 will during this movement engage the base plate 11 of the holder and the holder is thus raised in unison with the pivoted frame 28; upward movement of the holder with relation to the trackway being permitted as sufficient slack is provided in the chain to which the holders are pivotally connected. The upward movement is comparatively small as the holder is traveling at a continuous rate of speed in the direction of arrow a. During movement in that direction the upward movement takes place and when the upward movement is completed the holder will have moved to a position where the slicing knives are cleared. At this time cam 83 transmits a lowering movement to the sleeve and arms 78 and the holder is thus lowered into engagement with the trackway where it continues its movement. The mechanism shown in Figs. 10 and 11 thus prevents any binding action between the holders and the slicing blades.

After the holder has cleared the slicing blades the movement is continued and when the holder reaches the end of the trackway the pocket or recess 16 is swept by an arm 85, see Figs. 1 and 2. This arm is secured on the shaft 4. The outer end is provided with a rubber or leather pad such as shown at 86. This forms a flexible paddle conforming to the contour of the pocket 16 formed in the holder and as the pad sweeps the pocket it discharges the sliced fruit and at the same time cleans the pocket. The fruit discharged in the manner described is deposited on a discharge conveyor or similar mechanism but this is not shown.

The cycle of operation, to-wit, that of first placing a half section of fruit in the pocket 16 of a holder; secondly, properly positioning the sliced section of fruit by means of the shoes 23; third, subjecting the fruit to a pitting action; fourth, stemming the fruit; and fifth, slicing the same is imparted as each holder moves into position below the pivoted frame 28 and the sliced fruit is discharged at the end of the trackway by means of the arm 85 and the pad 86 carried thereby. The machine, as previously stated, is adapted to handle different varieties of fruit and also fruits of different shape. If peaches are handled the pockets 16 formed in the holder are substantially semi-spherical shaped. If pears are to be stemmed and cored the pocket 16 will be shaped accordingly. This necessitates change of the blocks 12, 13 and 14 forming the holder and as these blocks are independently secured one or more may be removed to make the change desired or the several blocks together with the base plate 11 may be removed and another holder inserted by merely removing the pivot pin whereby connection is made between the holder and the driving chain. A change from one variety of fruit to another may thus be quickly accomplished. In some instances the machine is employed for slicing purposes only, for instance, peaches which have already been canned are sometimes opened and the halved peaches are removed from the cans and placed in the machine here shown. The halved peaches are sliced but they are not pitted and stemmed as the pits and stems have previously been removed, hence the machine may function as a slicing machine only. If the fruit handled is canned peaches it is obvious that they are more or less sticky and covered with syrup, hence the importance of employing the arm 85 and pad 86 for positively removing the sliced sections and to insure cleaning the surface of the pocket to prevent excess accumulation of syrup, etc. Where the machine is used for slicing purposes only the pitting knife and the stemmer may be removed. If the machine is used for handling pears the shape of the pitting blade may in some instances be slightly altered. In that case instead of pitting, the blade will core the pear and the stemmer will remove the stem and end portion of the pear. With peaches the stemmer is not always required. Suffice it to say, that different varieties of fruit may be handled by the machine shown, all operations being automatic. The only operation required by the operator being that of placing the halved sections of fruit in the holders.

An automatic feed may be employed for that purpose, but it is neither described nor claimed in the present instance.

Fig. 14 shows a modified mounting for the stemmer and the slicing knife. In this instance, the arm indicated at 34a, which supports the slicing knife 31a and the scoop or stemmer 32a is pivotally supported in the frame 28. This frame, as previously described, is pivotally supported at 29 and is raised and lowered by means of the member 37a formed on the bar 37 and the cam actuating the same.

In the present instance, a second lug indicated at 37b is formed on bar 37. This lug engages an arm 28a. This arm is pivotally supported as at 29a in a bracket secured to the main frame. The opposite end of the arm 28a is provided with a pin 28b and this extends through a slot formed on the arm 34a. The arm 34a carries the knife 31a and the stemmer 32a and it is pivotally supported as at 35a in a lug or hanger secured to the pivoted frame 28. An adjustable stop screw 29b is provided which limits the pivotal movement of the arm 34a and a fork shaped guide bracket 36a is employed to guide the arm 34a.

The operation of this part of the mechanism will be as follows: With the frame 28 in its raised position, lowering movement thereof will take place when one of the holders 10 approaches the position shown in Fig. 14 indicated at 10a, lowering movement of the frame being accomplished by the cam 2a and roller 2b. The roller 2b is carried by the bar 37, and as the roller descends, the cam bar 37 will descend and so will the lugs 37a and 37b. Hence, the frame 28 and the shoes 23 will descend towards the holder 10a. An arm 28a will also descend with the lug 37b. The opposite end of the arm, that is, the end carrying the pin 28b, will rise and as such will engage the upper end of the slot, and thereby impart pivotal movement to the arm 34a until it engages the adjustable stop screw 29b. At that point, arm 34a carrying the slicing knife and stemmer will descend in unison with the frame 28 and the shoes 23, and the descending movement will stop the moment the upper flat surface of the fruit placed in the holder 10a is engaged.

In view of the fact that the holder 10a moves in the direction of arrow a, as previously described, it will first be pitted by the pitting knife and it will then be engaged by the stemmer 32a and finally by the slicing knives 31a, the slicing knives passing through the slots 15 in the holder and through the fruit placed in the holder. When the knives are disposed in the slots 15, cam 2a will assume a position where it commences to raise the roller 2b, the bar 37 and the lugs 37a and 37b. A jamming between the knives and the side walls of the slots 15 would accordingly tend to take place. The slots are, however, frame supporting the knife is moving away from the fruit.

20. In a machine of the character described, a movable fruit holder, an elongated frame pivotally supported adjacent the holder, a second holder slidable on said frame to engage fruit as it is moved by said second holder, means for swinging said frame toward and away from the first holder to cause engagement and disengagement of the second holder with the fruit, a knife carried by the frame and adapted to sever the fruit in the first holder, and means for causing the first holder to follow the movement of the frame away from it during the period that the knife is engaging the fruit.

21. In a machine of the character described, a movable fruit holder adapted to receive a half-section of fruit, a secondary holding means engageable with the flat surface of the half-section of fruit and movable with the holder and half-section of fruit placed therein, and a slicing knife placed in the path of movement of the fruit holder and adapted to slice fruit placed therein while the fruit is being engaged by the secondary holding means.

22. In a machine of the character described, a movable fruit holder adapted to receive a half-section of fruit, a secondary holding means engageable with the flat surface of the half-section of fruit and movable with the holder and half-section of fruit placed therein, and a stemming knife placed in the path of movement of the fruit holder and adapted to cut a longitudinal groove in the flat surface of the fruit to remove the stem while the fruit is being engaged by the secondary holding means.

ADOLF H. NELSON.